United States Patent [19]

Raudabaugh

[11] Patent Number: 5,057,810

[45] Date of Patent: Oct. 15, 1991

[54] ARRESTER ISOLATOR-DISCONNECTOR

[75] Inventor: Donald E. Raudabaugh, Wadsworth, Ohio

[73] Assignee: Hubbell Incorporated, Orange, Conn.

[21] Appl. No.: 655,026

[22] Filed: Feb. 14, 1991

[51] Int. Cl.[5] ....................... H01H 39/00; H02H 3/22

[52] U.S. Cl. ........................................ 337/30; 337/34; 361/124; 361/125

[58] Field of Search ....................... 337/30, 14, 15, 20, 337/28, 29, 31, 32, 33, 34; 361/117, 124, 125, 131

[56] References Cited

U.S. PATENT DOCUMENTS

| | | |
|---|---|---|
| 2,305,436 | 12/1942 | McMorris . |
| 2,820,869 | 1/1958 | Hedlund et al. . |
| 2,957,967 | 10/1960 | MacRae . |
| 2,989,608 | 6/1961 | Hicks . |
| 3,017,539 | 1/1962 | Robinson . |
| 3,100,246 | 8/1963 | Riley . |
| 3,239,631 | 3/1966 | Snell, Jr. . |
| 3,291,937 | 12/1966 | Carothers et al. . |
| 3,588,773 | 6/1971 | Carothers . |
| 3,668,458 | 6/1972 | Irie et al. . |
| 3,679,938 | 7/1972 | Carothers et al. . |
| 3,702,419 | 11/1972 | Carothers et al. . |
| 3,869,650 | 3/1975 | Cunningham et al. . |
| 4,204,238 | 5/1980 | Stetson . |
| 4,479,105 | 10/1984 | Banes . |
| 4,503,414 | 3/1985 | Sykes et al. . |
| 4,734,823 | 3/1988 | Cunningham . |

FOREIGN PATENT DOCUMENTS

| | | |
|---|---|---|
| 1583913 | 2/1981 | United Kingdom . |

*Primary Examiner*—Harold Broome
*Attorney, Agent, or Firm*—Jerry M. Presson; Mark S. Bicks

[57] ABSTRACT

A device for connecting and then isolating and disconnecting an arrester has a first electrical terminal, a second electrical terminal and first and second circuits for electrically connecting the first and second terminals. The first circuit includes a conductive casing mechanically coupled to the first and second terminals and a spark gap located between the outside of the casing and second terminal. The second circuit includes an interrupting mechanism for automatically interrupting connection between the first and second terminals.

21 Claims, 2 Drawing Sheets

ARRESTER ISOLATOR-DISCONNECTOR

REFERENCE TO RELATED APPLICATION

The subject matter of this application is related to U.S. patent application Ser. No. 07/656,002 of Donald E. Raudabaugh, entitled Lightning Arrester Isolator and concurrently filed herewith. The subject matter of the related application is hereby incorporated herein by reference.

FIELD OF THE INVENTION

The present invention relates to a device for connecting and then isolating and disconnecting an arrester from between a power line and ground. More particularly, the present invention is a device having a pair of electrical terminals with two parallel electrical circuit paths therebetween. The first circuit path includes a spark gap, and the second circuit path includes an interrupting mechanism for automatically disconnecting electrical conduction between the two terminals and from the arrester upon arrester failure.

BACKGROUND OF THE INVENTION

Lightning or surge arresters are typically connected to power lines to carry electrical surge currents to ground and, thus, prevent damage to the lines and equipment connected thereto. Arresters offer high resistance to normal voltage across power lines, yet offer very low resistance to surge currents produced by sudden high voltage conditions caused by lightning strikes, for example. After the surge, the voltage should drop and the arrester should then normally return to a high resistance state. However, in the case of arrester malfunction or failure, the high resistance state is not resumed, and the arrester continues to provide an electrical path from the power line to ground. Ultimately, the line will fail due to a short circuit condition or breakdown of the distribution transformers, and the arrester will require replacement.

To avoid line failure, disconnectors are commonly used in conjunction with arresters to separate a malfunctioning arrester from the circuit and provide visual indication of arrester failure. Conventional disconnectors have an explosive charge to destroy the circuit path and physically separate the electrical terminals. Upon exploding, however, some prior disconnectors propelled parts of the device at high velocity into the surrounding area endangering persons and property in the vicinity. In addition, fragile housings, used to ensure disconnection upon detonation, often broke during installation. Other prior disconnectors did not generate enough explosive force to break the circuit.

Examples of prior disconnector devices are disclosed in McMorris U.S. Pat. No. 2,305,436; Hedlund et al U.S. Pat. No. 2,820,869; MacRae U.S. Pat. No. 2,957,967; Hicks U.S. Pat. No. 2,989,608; Robinson U.S. Pat. No. 3,017,539; Riley U.S. Pat. No. 3,100,246; Snell, Jr. U.S. Pat. No. 3,239,631; Carothers et al. U.S. Pat. No. 3,291,937; Carothers U.S. Pat. No. 3,588,773; Irie et al. U.S. Pat. No. 3,668,458; Carothers et al. U.S. Pat. No(s). 3,679,938 and 3,702,419; Cunningham et al. 3,869,650; Stetson U.S. Pat. No. 4,204,238; Barnes U.S. Pat. No. 4,479,105; Sykes et al. U.S. Pat. No. 4,503,414; and Cunningham U.S. Pat. No. 4,738,823.

SUMMARY OF THE INVENTION

An object of the present invention is to provide a device that reliably and sufficiently disconnects a malfunctioning arrester from ground and avoids disconnection before arrester failure.

Another object of the present invention is to provide a device that is durable and strong enough to withstand handling during installation.

A further object of the present invention is to provide a device which blows apart without shattering.

Still another object of the present invention is to provide a device which produces sufficient explosive force to completely disconnect an arrester from the circuit.

The foregoing objects are basically attained by a device for connecting and then isolating and disconnecting an arrester, comprising a first electrical terminal, a second electrical terminal, a first circuit for electrically connecting the first and second terminals and a second circuit for electrically connecting the first and second terminals. The first circuit includes an electrically conductive unitary casing mechanically coupled to the first and second terminals and a spark gap between the casing and the second terminal. The second circuit includes an interrupting mechanism for automatically interrupting the electrical connection between the first and second terminals.

The foregoing objects are further attained by a device for connecting and then isolating and disconnecting an arrester, comprising a first electrical terminal, a second electrical terminal and a hollow electrically conductive casing coupled to the first and second terminals. Located within the casing is a nonconductive liner which insulates the second terminal from the casing. A first circuit electrically connecting the first and second terminals is also located within the casing. A spark gap is defined between the casing and second terminal.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF THE INVENTION

Figure 1:
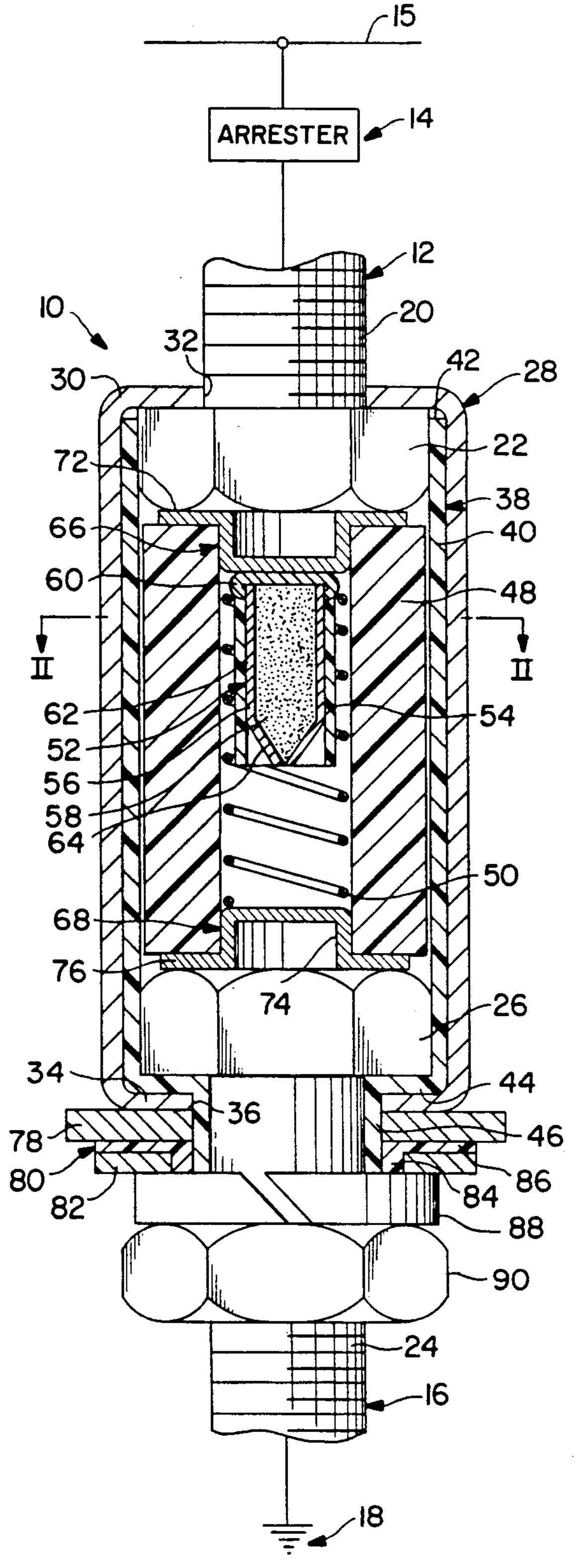
FIG. 1 is a partial side elevational view in section of a device in accordance with the present invention.

Referring initially to FIG. 1, an isolator-disconnector assembly or device 10 is illustrated in accordance with the present invention and includes a first, upper electrical terminal 12 electrically connected to arrester 14 and a second, lower electrical terminal 16 which is electrically connected to ground 18. Arrester 14 is electrically connected to power line 15 which is representative of a power system. Terminals 12 and 16 are mechanically and electrically coupled to each other.

Arrester 14 is conventional, and thus, is not described in detail. The arrester can be formed according to Raudabauch U.S. Pat. No. 4,656,555, the subject matter of which is hereby incorporated herein by reference.

Electrical terminal 12 is an electrically conductive hexagonal cap bolt having a cylindrical threaded body 20 and an enlarged head 22, and is preferably made of stainless steel. Electrical terminal 16 is similarly configured with threaded body 24 and enlarged head 26.

As seen in FIG. 1, heads 22 and 26 of terminals 12 and 16 are retained with tubular casing 28. Casing 28 is an electrically conductive, unitary member with a hexagonal cross-sectional configuration. A first open end 30 of casing 28 is folded over to form aperture 32. A second open end 34 of the casing is folded over to form aperture 36. Casing 28 is preferably made of aluminum.

Disposed within casing 28 is tubular, insulating, non-conductive liner 38 having a hexagonal body section 40, a first open end 42 and a second end 44. Second end 44 has a cylindrical neck extension 46. Liner 38 is preferably made of acetal. Acetal resins are very strong and stiff thermoplastics, and are characterized by good fatigue life, resilience, low moisture sensitivity, high solvent and chemical resistance and good electrical properties. Acetal evolves gas when exposed to high temperatures.

Figure 2:
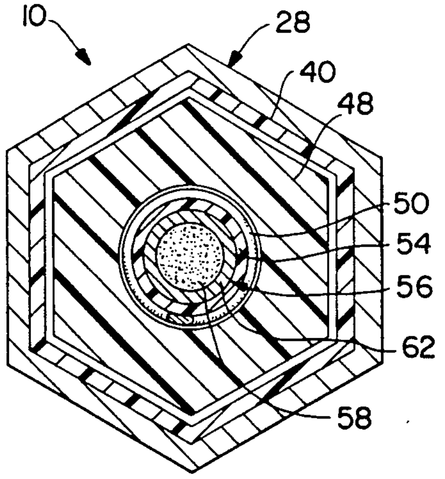
FIG. 2 is a top plan view in section of the device taken along line II—II of FIG. 1.

Explosive chamber 48 is located within liner 40. Chamber 48 is hollow and, when viewed in transverse cross-section (FIG. 2) has a hexagonal exterior and circular cylindrical interior. Hollow chamber 48 is also preferably made of acetal.

Spring 50 is disposed within explosive chamber 48 and is formed as a stainless steel compression spring. In device 10, spring 50 behaves as a fuse wire or a fuse link. Spring-fuse link 50 is selected to be inoperable at $I^2t$ of less than 150 amp$^2$-sec. $I^2t$ is a characteristic of fuses relating to the amount of energy required to bring the bulk of the fuse to a fusible temperature. The fuse values may be selected by choosing various wire gauges for spring-fuse link 50, with larger wire requiring more current time and finer wire requiring less current time to melt the fuse.

Disposed within spring 50 is cartridge 52 encased in cartridge sleeve 54. Cartridge 52 is a 0.22 caliber circuit breaker blank made of a brass shell 56 and explosive charge 58. Shell 56 is an unprimed cylindrical tube having an upper end with rolled lip 60, a central body part 62 and a lower crimped portion 64 which is waterproofed with resin varnish. Cartridge sleeve 54 is a vinyl, flexible, non-conductive cylindrical tube which fits snugly around central body part 62 of cartridge 52. The sleeve-encased cartridge 52 fits within spring 50 with upper lip 60 contacting spring 50.

Arranged at both ends of chamber 48 are a first upper spring disc 66 and a second lower spring disc 68. Spring disc 66 has a central elevated hat portion 70 having a central planar top and downwardly extending cylindrical sidewall. A circular rim 72 is angled from hat portion 70 at about 100 degrees from the sidewall. Similarly, spring disc 68 has a hat portion 74 and a circular angled rim 76. Spring discs 66 and 68 are made of conductive phosphor bronze.

Figure 3:
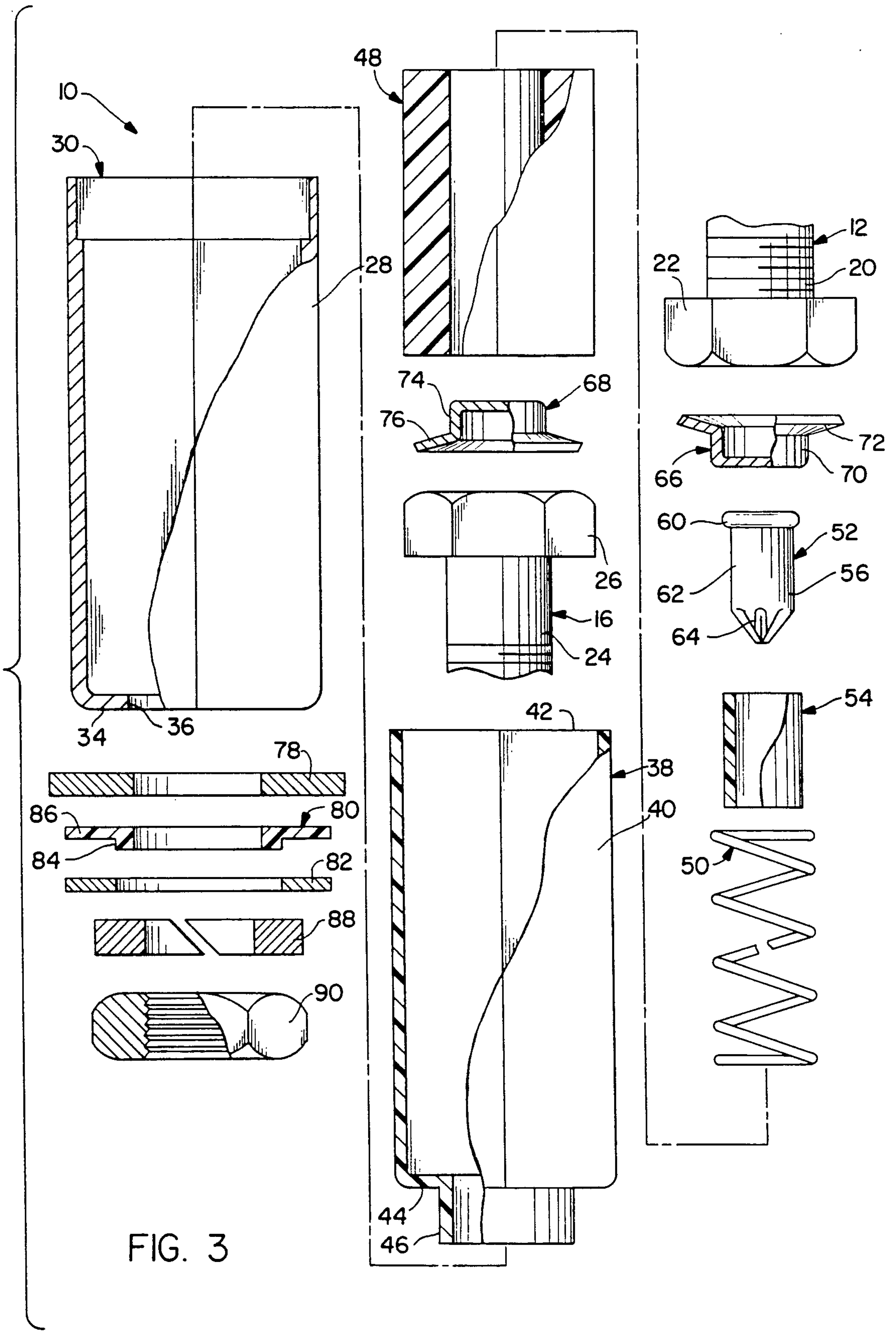
FIG. 3 is an exploded side elevational view in partial section of the device of FIG. 1.

Outside of casing 28, surrounding neck extension 46 of liner 38, are a flat washer 78, a gap spacer 80 and a gap washer 82. Flat washer 78 and gap washer 82 are both conductive ring shaped washers, preferably made of stainless steel. Flat washer 78 has a larger exterior diameter and smaller interior diameter than washer 82 as seen in FIGS. 1 and 3. Gap spacer 80 is a ring-shaped disc with an interior, axially extending rim 84 and a radially extending flange 86. Gap spacer 80 is non-conductive and preferably formed of molded acetal.

Located around body 24 of second terminal 16 are ring-shaped lock washer 88 and hex jam nut 90 which has internal threads. Both are electrically conductive and preferably made of stainless steel.

Assembly

Hollow casing 28 is initially provided with open end 30 and folded partially closed end 34 having aperture 36 as illustrated in FIG. 3. Non-conductive liner 38 is inserted into hollow casing 28 with cylindrical neck extension 46 of liner 38 extending through aperture 36. Lower electrical terminal 16 is placed within liner 38 with enlarged head 26 being retained in body 40 of liner 38 and threaded body 24 of terminal 16 extending through neck extension 46. Spring disc 68 is placed on enlarged head 26 of terminal 16. Explosive chamber 48 is then placed on top of spring disc 68 such that hat portion 74 rests within explosive chamber 48 and rim 76 is compressed between the end of chamber 48 and enlarged head 26 of terminal 16.

Next, cartridge 52 is prepared to be placed within explosive chamber 48 by placing cartridge 52 within hollow liner 54 and inserting the assembly into spring 50. Upper lip 60 of cartridge 52 directly contacts the upper portion of spring 50, while liner 54 insulates body 62 and crimp 64 of cartridge 52 from the remainder of spring 50. Spring 50 with encased cartridge 52 is then inserted into explosive chamber 48 with the bottom of spring 50 resting on hat portion 74 of spring disc 68. Spring disc 66 is then placed on top of explosive chamber 48 with hat portion 70 extending into the hollow chamber and abutting cartridge 52. Upper electrical terminal 12 is placed with enlarged head 22 engaging rim 72 of spring disc 66. The open end 30 of casing 28 is then folded over head 22 of terminal 12 leaving threaded body 20 of terminal 12 protruding from the casing 28. By coupling casing 28 around heads 22 and 26 of terminals 12 and 16, respectively, the rims 72 and 76 of spring discs 66 and 68 are biased placing explosive chamber 48 and spring 50 in compression and outer casing 28 in tension.

After the components are placed within casing 28, flat washer 78 is slid over neck extension 46 of liner 38 protruding from aperture 36 in the second end 34 of casing 28. Following washer 78, gap spacer 80 is slid over neck extension 46 and gap washer 82 is slid around rim 84 and up against flange 86. To lock washers 78 and 82 and gap spacer 80 in place, lock washer 88 is placed over threaded body 24 of terminal 16, and hex jam nut 90 is threaded onto body 24.

It is also possible to assemble the lower components including washer 78, gap spacer 80, gap washer 82, lock washer 88 and jam nut 90 after lower terminal 16 is in place and before upper terminal 12 is secured into housing 28.

Thus, flat washer 78 is electrically coupled to casing 28, yet electrically insulated from both second, lower terminal 16 by liner 38 and from gap washer 82 by gap spacer 80.

Operation

Once assembled, isolator-disconnector device 10 is electrically connected to arrester 14 via electrical terminal 12 and to ground 18 via electrical terminal 16 according to conventional practice. The normal low current passing through the arrester 14 flows through a low resistance path in the device 10. The low resistance path includes electrical terminal 12, upper spring disc 66, shell 56 of cartridge 52, spring 50, lower spring disc 68, and electrical terminal 16. Steady state arrester currents are usually less than one milliampere and pass through the circuit without activating the disconnecting components of device 10.

When exposed to lightning or switching surge currents, the arrester experiences extremely high pulse currents which travel through a higher resistance path.

The higher resistance path or first circuit includes electrical terminal 12, casing 28, flat washer 78, gap washer 82, lock washer 88, jam nut 90 and second terminal 16. The higher resistance is caused by gap spacer 80 which defines a spark gap between flat washer 78 and gap washer 82. The gap sparks over for high current, short duration pulses which last usually less than one hundred microseconds for lightning and less than several milliseconds for switching surges. The protective gap will spark over at about 700 to 2000 volts. In the preferred embodiment, the gap is about 0.005 inches wide. Using average electrical parameters, the gap will spark over currents exceeding 1500 amperes. For tens and hundreds of thousands of amperes experienced in lightning charges, the protective gap is sparked over rapidly and the duration of the arc voltage is extremely short. In the case of switching surges, the current is usually insufficient to activate the protective gap. The external gap zone is designed with one gap washer larger than the other to protect the edges of the gap from handling damage.

The protective gap in the present device 10 has a lower spark over voltage than in prior devices having spark gaps because the protective arc is outside the confines of casing 28 and the arc can balloon away from the point of arc initiation. The arc motion is also enhanced by gap spacer 80 being made of acetal which evolves gas when exposed to arc temperatures. The gas spark over voltage in the design range of the present invention is from 700 to 2,000 volts, while most prior designs range from 5,000 to 15,000 volts for spark over.

As discussed, steady state arrester currents will travel through a second circuit in the device including electrical terminal 12, spring disc 66, shell 56 of cartridge 52, fuse-link spring 50, spring disc 68, and electrical terminal 16. If the lightning arrester fails to withstand system voltage, short circuit currents of tens to tens of thousands of amperes may flow through the faulted arrester. In isolator-disconnector device 10, fault currents passing through spring 50 cause the spring to behave as a fuse wire.

The prolonged passage of fault current melts the fuse-link spring forming a second spark gap, drawing an arc which activates the unprimed cartridge 52 and causing an explosion which separates one terminal from the other. The force of the exploded charge forces at least one of the terminals out of casing 28 at a folded end 30 and/or 34 of the casing. In addition, the high temperature of the arc evolves gas from explosive chamber 48 adding additional explosive pressure within device 10 for blowing the terminals out of the casing. This action disconnects the arrester from the system, and provides a visual indication of the need for arrester replacement.

In cases of high pulse currents, fuse-link spring 50 only experiences protective gap arc voltage for a very short time period which is insufficient to activate the fuse-link spring. Power frequency fault currents below 1500 amperes will directly contribute to the fusing of link spring 50. Powerful currents above this level will establish a by-pass arc, but the duration of this arc and the arc voltage magnitude will be sufficient to activate the fuse link in an acceptable time period. At very low fault currents, tens of amperes and less, the current may not be sufficient to melt fuse-link spring 50 before cartridge 52 explodes. However, just raising the cartridge temperature to several hundred degrees Fahrenheit will cause detonation and disconnection. However, the primary mode of detonation is heating by exposure to an arc drawn by failing fuse 50. In addition, explosive chamber 48 is formed of acetal which generates gas when exposed to arc voltage which aids in blowing the device apart and separating the terminals.

When device 10 is installed in a power line system the casing is subjected to tensile forces from the system and from the internal spring disc 68 and 66. This allows the needed electrical insulation to be placed under compression and does not load the insulating material in tension. The casing of the present invention has a tensile ultimate in the range of 500 to 1,000 pounds. The load strength may be adjusted by altering the materials used in the casing or by changing the thickness of the material folded over the heads of the terminals. This arrangement provides device 10 with strength when in place, yet helps force the components apart when the device is activated.

Thus, in situations of long duration, high current as occurs with failure of the lightning arrester allowing current to continue to flow to ground, the spring link fuse 50 in conjunction with cartridge 52 and explosive chamber 48 and spring discs 66 and 68 act as means for interrupting the circuit and forcibly separate the terminals 12 and 16. The disconnection also provides visual evidence of a failed arrester.

While one embodiment has been chosen to illustrate the invention, it will be understood by those skilled in the art that various changes and modifications can be made therein without departing from the scope of the invention as defined in the appended claims.

What is claimed is:

1. A device for connecting and then isolating and disconnecting an arrester, comprising:
- a first electrical terminal;
- a second electrical terminal;
- a first circuit means for electrically connecting said first and second terminals, said first circuit means including
  - an electrically conductive, unitary casing mechanically coupled to said first and second terminals, and
  - gap means for defining a spark gap coupled between said casing and said second terminal; and
  - second circuit means for electrically connecting said first and second terminals, said second circuit means including
  - interrupting means for automatically interrupting the electrical connection of said second circuit means between said first and second terminals.

2. A device according to claim 1, wherein
said first and second circuit means are arranged in parallel.

3. A device according to claim 1, wherein said casing is coupled in tension.

4. A device according to claim 1, and further comprising liner means within said casing for insulating said casing from direct electrical contact with said second terminal.

5. A device according to claim 1, wherein said gap means comprises a gap spacer formed of gas generating material.

6. A device according to claim 5, wherein said gap spacer is formed of acetal.

7. A device according to claim 1, wherein said second circuit means comprises a second spark gap bridged by a fuse-link.

8. A device according to claim 7, wherein said fuse-link is a spring.

9. A device according to claim 7, wherein said second circuit means further comprises an explosive charge adjacent to said fuse-link.

10. A device according to claim 7, wherein said second circuit means further comprises an acetal explosive chamber.

11. A device according to claim 10 wherein said second circuit means further comprises at least one spring disc abutting said chamber and placing said chamber in compression.

12. A device according to claim 1, wherein said second circuit means further comprises at least one spring disc disposed within said casing and causing said casing to be coupled in tension.

13. A device according to claim 1, wherein said casing is tubular and has a first end and a second end, said first end is folded over a portion of said first terminal, and said second end is folded over a portion of said second terminal.

14. A device according to claim 1, wherein said second circuit means is located within said casing.

15. A device according to claim 14, wherein said gap means is located outside of said casing.

16. A device according to claim 1, wherein said casing has a first end electrically coupled to said first terminal and a second end insulated from said second terminal; and said gap means comprises a non-conductive gap spacer disposed around said second terminal and adjacent and outside said second end of said casing, and a pair of conductive washers, one on each side of said gap spacer.

17. A device according to claim 16, wherein one of said pair of conductive washers has a larger diameter than the other of said pair.

18. A device for connecting and then isolating and disconnecting an arrester, comprising:

a first electrical terminal;

a second electrical terminal;

a hollow electrically conductive casing coupled to said first and second terminals;

non-conductive liner means located within said casing and disposed between said casing and said second terminal, insulating said second terminal from said casing;

circuit means for electrically connecting said first and second terminals located within said casing; and gap means for defining a spark gap between said casing and said second terminal.

19. A device according to claim 18, wherein said circuit means includes a second spark gap bridged by a fuse link adjacent to an explosive charge.

20. A device according to claim 19, wherein said gap means is located outside of said casing.

21. A device for connecting and then isolating and disconnecting an arrester, comprising:

a hollow, electrically conductive casing having an end with an aperture therein;

a non-conductive liner located within said casing and extending through said aperture;

a lower electrical terminal located within said liner and extending through said aperture;

a lower conductive spring disc electrically coupled to said lower terminal in said casing;

a fuse-link spring electrically coupled to said lower disc in said casing;

a cartridge with an explosive charge and an insulating sleeve, said cartridge being electrically coupled to said spring and spaced from said lower disc;

an insulating, tubular, acetal explosive chamber surrounding said cartridge and said spring within said casing;

an upper conductive spring disc electrically coupled to said cartridge;

an upper electrical terminal electrically coupled to said upper disc and electrically coupled to said casing;

a non-conductive gap spacer coupled outside of and between said casing and said lower terminal; and a conductive washer electrically coupled to said lower terminal and electrically separated by said gap spacer from said casing.

* * * * *